United States Patent
Isago et al.

(10) Patent No.: US 9,441,109 B2
(45) Date of Patent: Sep. 13, 2016

(54) POLYPHENYLENE SULFIDE RESIN COMPOSITION, PRODUCTION METHOD OF THE SAME AND MOLDED PRODUCT

(71) Applicant: TORAY INDUSTRIES, INC., Tokyo (JP)

(72) Inventors: Hiroyuki Isago, Nagoya (JP); Kei Saitoh, Nagoya (JP); Hideki Matsumoto, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/761,777

(22) PCT Filed: Jan. 21, 2014

(86) PCT No.: PCT/JP2014/000277
§ 371 (c)(1),
(2) Date: Jul. 17, 2015

(87) PCT Pub. No.: WO2014/115536
PCT Pub. Date: Jul. 31, 2014

(65) Prior Publication Data
US 2015/0361265 A1 Dec. 17, 2015

(30) Foreign Application Priority Data

Jan. 23, 2013 (JP) ................. 2013-010038
Sep. 19, 2013 (JP) ................. 2013-193844

(51) Int. Cl.
| | | |
|---|---|---|
| *C08L 81/04* | (2006.01) | |
| *C08L 27/18* | (2006.01) | |
| *B29C 47/60* | (2006.01) | |
| *C08L 27/20* | (2006.01) | |
| *B29B 7/48* | (2006.01) | |
| *C08K 5/54* | (2006.01) | |

(52) U.S. Cl.
CPC ............ *C08L 81/04* (2013.01); *B29C 47/6056* (2013.01); *B29C 47/6087* (2013.01); *C08L 27/18* (2013.01); *C08L 27/20* (2013.01); *B29B 7/489* (2013.01); *C08K 5/54* (2013.01)

(58) Field of Classification Search
CPC ..... C08L 27/20; C08L 27/18; B29C 47/6087
USPC ........................ 525/102, 104, 189
See application file for complete search history.

(56) References Cited

U.S. PATENT DOCUMENTS

| | | |
|---|---|---|
| 5,159,019 A | 10/1992 | Yamamoto |
| 6,121,353 A | 9/2000 | Umino |
| 2004/0209977 A1 | 10/2004 | Hossan |
| 2011/0040017 A1 | 2/2011 | Lehmann |

FOREIGN PATENT DOCUMENTS

| | | |
|---|---|---|
| DE | 10 2007 038 929 A1 | 2/2009 |
| EP | 0 460 689 A1 | 12/1991 |
| EP | 0 626 424 A1 | 11/1994 |
| EP | 0 761 757 A1 | 3/1997 |
| JP | 03106991 | 5/1991 |
| JP | 03263464 | 11/1991 |
| JP | 0445195 | 2/1992 |
| JP | 0853592 | 2/1996 |
| JP | 10235713 | 9/1998 |
| JP | 2005187809 | 7/2005 |
| JP | 2006273984 | 10/2006 |
| JP | 2006523558 | 10/2006 |
| JP | 3887024 | 2/2007 |
| JP | 2008308657 | 12/2008 |
| JP | 2011201311 | 10/2011 |
| WO | 9821277 | 5/1998 |

OTHER PUBLICATIONS

International Search Report for International Application No. PCT/JP2014/000277 mailed Apr. 28, 2014.
EP Extended Search Report for App. No. 14 742 816.3, Issued Jul. 14, 2016, 9 Pages.

*Primary Examiner* — Terressa Boykin
(74) *Attorney, Agent, or Firm* — RatnerPrestia (57) ABSTRACT

The invention provides a PPS resin composition having excellent heat resistance and excellent electrical properties without damaging excellent physical properties including mechanical properties and low gas generation which PPS intrinsically has. There is provided a resin composition comprising (a) a polyphenylene sulfide resin and (b) one or more copolymers selected among a tetrafluoroethylene/hexafluoropropylene copolymer, an ethylene/tetrafluoroethylene copolymer and a tetrafluoroethylene/perfluoro(alkyl vinyl ether) copolymer. In the resin composition, (a) the polyphenylene sulfide resin forms a continuous phase, (b) one copolymer selected among the above components forms primary dispersed phases, and the primary dispersed phase includes secondary dispersed phases formed by a component different from the component of the primary dispersed phase.

7 Claims, 1 Drawing Sheet

POLYPHENYLENE SULFIDE RESIN COMPOSITION, PRODUCTION METHOD OF THE SAME AND MOLDED PRODUCT

CROSS REFERENCE TO RELATED APPLICATIONS

This is the U.S. National Phase application of PCT International Application No. PCT/JP2014/000277, filed Jan. 21, 2014, and claims priority to Japanese Patent Application No. 2013-010038, filed Jan. 23, 2013, and Japanese Patent Application No. 2013-193844, filed Sep. 19, 2013, the disclosures of each of these applications being incorporated herein by reference in their entireties for all purposes.

FIELD OF THE INVENTION

The present application claims priority from Japanese Patent Application No. 2013-010038 filed on Jan. 23, 2013 and Japanese Patent Application No. 2013-193844 filed on Sep. 19, 2013, the entireties of disclosures of which are hereby incorporated by reference into this application.

The present invention relates to a polyphenylene sulfide resin composition, a manufacturing method of the same and a molded product.

BACKGROUND OF THE INVENTION

The polyphenylene sulfide (hereinafter also called "PPS") resin is an engineering plastic having excellent heat resistance, flame retardancy, chemical resistance, electrical insulation, moist heat resistance, mechanical strength and dimensional stability. The PPS resin is moldable to various molded products, fibers, films and the like by any of various molding techniques such as injection molding or extrusion molding and is practically used in a wide variety of fields including electric and electronic parts, mechanical parts and automobile parts. The PPS resin, however, has relatively low breakdown voltage and high relative permittivity as the problem. Especially in the electric and electronic fields and communication field, a material of low relative permittivity is required, accompanied with an increase in frequency for the purpose of high-speed processing and high-speed transmission of information.

A tetrafluoroethylene/hexafluoropropylene copolymer, an ethylene/tetrafluoroethylene copolymer and a tetrafluoroethylene/perfluoro(alkyl vinyl ether) copolymer which are fluororesins generally have excellent non-adhesiveness, mold releasability, heat resistance, chemical resistance, slidability and electrical properties and additionally have the advantage of melt processability even in the fluororesin.

Various techniques have been proposed to mix the polyphenylene sulfide resin with the fluororesin and provide various physical properties which are not readily obtained by the simple substance (for example, Patent Document 1).

PATENT DOCUMENTS

Patent Document 1: JP H03-263464A
Patent Document 2: WO 1998-21277A
Patent Document 3: JP H08-53592A
Patent Document 4: JP H03-106991A
Patent Document 5: JP H04-45195A

SUMMARY OF THE INVENTION

Due to the high non-adhesiveness and the mold releasability of the fluororesin, however, a polymer alloy of the fluororesin and another resin has poor interfacial bond strength at the interface and has difficulty in providing sufficient mechanical properties.

For example, Patent Document 1 employs a technique of melt-kneading two or more fluororesin components and subsequently kneading the fluororesins with a PPS resin at a temperature of not higher than the melting point of one of the fluororesin components, so as to form dispersed phases of the fluororesins in a PPS resin phase and disperse the fluororesin component which is not melted during kneading, in the core shell structure in the dispersed phases. This enhances the compatibility between the PPS resin and the two or more fluororesins and improves various physical properties and appearance. While an area of relatively low composition ratio of the fluororesins provides the good appearance, however, an area of high composition ratio of the fluororesins does not provide the good compatibility. Even at the low composition ratio of the fluororesins, the dispersion particle size of the fluororesin as the core of the core shell dispersion structure is expected to be 5 to 50 m. This is not sufficiently fine dispersion and leads to deterioration of mechanical properties.

Patent Document 2 adds an ethylene/tetrafluoroethylene copolymer of low melting point and high melt viscosity and a compatibility accelerator to a PPS resin and obtains a polymer alloy of good mechanical properties by microdispersion of the ethylene/tetrafluoroethylene copolymer and the PPS resin.

Patent Document 3 adds a fluororesin of a specified melting point and a silane compound to a polyarylene sulfide resin to obtain a composition having excellent mechanical properties.

Patent Documents 2 and 3 improve the dispersibility at the low composition ratio of the fluororesin and thereby provide relatively good mechanical properties. Neither Patent Document 2 nor Patent Document 3, however describes the dispersibility and the mechanical properties in the range of high composition ratio of the fluororesin.

Patent Document 4 adds polytetrafluoroethylene and a molten fluororesin to a PPS resin to provide the PPS resin with abrasion resistance and lubricating ability. This, however, uses polytetrafluoroethylene as the essential component and moreover melt-kneads the mixture at a temperature of not higher than the melting point of polytetrafluoroethylene, so that the dispersion state of the fluororesin is not controllable. Accordingly, the PPS resin composition of Patent Document 4 has difficulty in providing excellent mechanical properties.

Patent Document 5, on the other hand, adds polytetrafluoroethylene to a PPS resin to provide the PPS resin with abrasion resistance and lubricating ability and additionally uses a fluorine-containing molten resin to improve the impact resistance. Patent Document 5 melt-kneads polytetrafluoroethylene with the PPS resin at a temperature of not lower than the melting point of polytetrafluoroethylene. Kneading at the temperature higher than the processing temperature suitable for the PPS resin, however, causes degradation of the PPS resin and deterioration of the intrinsic properties of the PPS resin.

An object of the invention is to provide a PPS resin composition having various physical properties, such as excellent mechanical properties, excellent heat resistance and low gas generation which the PPS resin intrinsically has, as well as excellent electrical properties (high breakdown voltage and low relative permittivity).

As a result of intensive study to solve the above problems, the invention provides a PPS resin composition including a PPS resin and a specified fluororesin at a specified composition ratio and more specifically a PPS resin composition having good balance among the electrical properties, the heat resistance and the mechanical properties by controlling the dispersion state of the fluororesin in the composition.

In order to solve at least part of the problems described above, the invention may be implemented by the following aspects.

(1) A polyphenylene sulfide resin composition comprising 80 to 250 parts by weight of (b) one or more copolymers selected among a tetrafluoroethylene/hexafluoropropylene copolymer, an ethylene/tetrafluoroethylene copolymer and a tetrafluoroethylene/perfluoro(alkyl vinyl ether) copolymer, relative to 100 parts by weight of (a) a polyphenylene sulfide resin, wherein a molded product made of the resin composition has a resin phase-separated structure observed with an electron microscope, such that (a) the polyphenylene sulfide resin forms a continuous phase, that (b) one copolymer selected among the tetrafluoroethylene/hexafluoropropylene copolymer, the ethylene/tetrafluoroethylene copolymer and the tetrafluoroethylene/perfluoro(alkyl vinyl ether) copolymer forms primary dispersed phases, and that the primary dispersed phase in the resin composition includes secondary dispersed phases formed by a component different from the component of the primary dispersed phase.

(2) The polyphenylene sulfide resin composition according to (1), wherein in the resin phase-separated structure of the molded product made of the resin composition observed with the electron microscope, an area ratio of the secondary dispersed phases to the primary dispersed phases is equal to or higher than 5%.

(3) The polyphenylene sulfide resin composition according to either (1) or (2), wherein in the resin phase-separated structure of the molded product made of the resin composition observed with the electron microscope, a number-average dispersion particle size in the secondary dispersed phases included in the primary dispersed phases is 0.01 to 2 m.

(4) The polyphenylene sulfide resin composition according to any one of (1) to (3), further comprising 0.1 to 5 parts by weight of (c) a silane coupling compound having at least one functional group selected from an isocyanate group, an epoxy group and an amino group, relative to 100 parts by weight of (a) the polyphenylene sulfide resin.

(5) The polyphenylene sulfide resin composition according to any one of (1) to (4), wherein the polyphenylene sulfide resin has an ash content of not higher than 0.3% by weight and an amount of a volatile component of not higher than 0.8% by weight when the polyphenylene sulfide resin is melt-kneaded under vacuum at 320° C. for 120 minutes.

(6) A production method of the polyphenylene sulfide resin composition according to any one of (1) to (5), the production method performs melt-kneading using a twin-screw extruder that has a ratio L/D of a screw length L to a screw diameter D of not less than 10 and includes a stirrer screw with cutouts as 3 to 20% of the ratio L/D.

(7) A molded product made of the polyphenylene sulfide resin composition according to any one of (1) to (5).

The invention provides a PPS resin composition having excellent heat resistance and excellent electrical properties without damaging excellent physical properties including mechanical properties and low gas generation which PPS intrinsically has.

DETAILED DESCRIPTION OF EMBODIMENTS OF THE INVENTION

The following describes embodiments of the invention in detail.

(1) (a) Polyphenylene Sulfide Resin

The PPS resin used in embodiments of the invention is a polymer having a repeating unit shown by the following structural formula:

[Chem. 1]

In terms of the heat resistance, the PPS resin may be a polymer having 70 mol % or more of the repeating unit shown by the above structural formula and is preferably a polymer having 90 mol % or more of the repeating unit. The PPS resin may be configured, such that less than about 30 mol % of its repeating unit is comprised of, for example, repeating units having the following structures:

[Chem. 2]

A PPS copolymer partly including the above structures has a low melting point, so that a resin composition of this copolymer has an advantage in moldability.

The melt viscosity of the PPS resin used according to an embodiment of the invention is not specifically limited, but in terms of the flowability during melt-kneading and molding process and the dispersion structure controllability of a fluororesin during melt-kneading, is preferably not higher than 400 Pa·s (300° C., shear rate of 1216/s), is more preferably not higher than 300 Pa·s and is furthermore preferably not higher than 250 Pa·s. In general, a high molecular compound is likely to decrease the viscosity with a decrease in molecular weight. By taking into account a decrease in toughness accompanied with a decrease in molecular weight, the lower limit of the melt viscosity is preferably not lower than 30 Pa·s. Using a PPS resin having the melt viscosity of not higher than 400 Pa·s to be melt-kneaded with another resin suppresses significant shear heat generation. This accordingly suppresses degradation of the PPS resin itself and a fluororesin or an additive. For example, a method using Capilograph manufactured by Toyo Seiki Seisaku-sho, Ltd. may be employed to measure the melt viscosity.

In terms of improvement in mechanical properties, the ash content of the PPS resin used in the embodiment of the invention is preferably not higher than 0.3% by weight, is more preferably not higher than 0.2% by weight and is furthermore preferably not higher than 0.1% by weight. It is expected that the presence of a metal-containing substance measured as the ash content contributes to the mechanical properties and the heat resistance, although its mechanism is not elucidated.

The ash content is measured by the following procedure. Five grams of PPS base powder in the dried state is weighed in a crucible and is fired on an electric heater to a black lump substance. Firing continues in an electric furnace set at 550° C., until carbides are burned out. After the fired substance is cooled down in a desiccator, the weight of the fired substance is measured. The ash content is then calculated by comparison between the measured weight and the initial weight.

The amount of volatile component by heating and melting the PPS resin used in the embodiment of the invention under vacuum at 320° C. for 120 minutes is preferably not higher than 0.8% by weight, is more preferably not higher than 0.6% by weight and is furthermore preferably not higher than 0.4% by weight, in order to achieve the low gas generation and the high strength. The amount of volatile component includes decomposition products of the PPS resin and low molecular-weight substances. Such components are expected to interfere with high strengthening. The amount of volatile component herein is the amount of adhesive component liquefied or solidified by a cooling the component that is volatilized in the process of heating and melting the PPS resin under vacuum. The amount of volatile component is measured by heating a glass vial in which the PPS resin is vacuum sealed, in a tube furnace. The glass vial is formed to have a body portion of 100 mm×25 mm, a neck portion of 255 mm×12 mm and wall thickness of 1 mm.

The following describes a concrete measurement method of the amount of volatile component. Only the body portion of the glass vial in which the PPS resin is vacuum sealed is inserted into a tube furnace set at 320° C. and is heated for 120 minutes. Volatile gas is accordingly cooled and adheres to the neck portion of the vial that is not heated in the tube furnace. After the neck portion is cut out and is weighed, the adhering volatile component is dissolved in chloroform for removal. The neck portion is subsequently dried and is weighed again. The ratio of the weight difference of the vial neck portion before and after removal of the volatile component to the weight of the PPS resin used for measurement is calculated as the amount of volatile component.

The following describes a production method of the PPS resin used according to the embodiment of the invention. The production method is, however, not limited to the method described below but may be any other method that produces the PPS resin of the above structure.

First, the following describes the details of a polyhalogenated aromatic compound, a sulfidizing agent, a polymerization solvent, a molecular weight modifier, a polymerization modifier and a polymerization stabilizer used in the production method.

[Polyhalogenated Aromatic Compound]

The polyhalogenated aromatic compound is a compound having two or more halogen atoms in one molecule. Specific examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5,-dichloro-p-xylene, 1,4-dibromobenzene, 1,4-diiodobenzene and 1-methoxy-2,5-dichlorobenzene, and p-dichlorobenzene is used preferably. Additionally, two or more different polyhalogenated aromatic compounds may be used in combination to form a copolymer. This copolymer preferably has a p-dihalogenated aromatic compound as the major component.

In terms of obtaining the PPS resin having the viscosity suitable for processing, the lower limit of the used amount of the polyhalogenated aromatic compound is preferably 0.9 mol, is more preferably 0.95 mol and is furthermore preferably 1.005 mol per 1 mol of the sulfidizing agent. The upper limit of the used amount of the polyhalogenated aromatic compound is preferably not greater than 2.0 mol, is more preferably not greater than 1.5 mol and is furthermore preferably not greater than 1.2 mol per 1 mole of the sulfidizing agent.

[Sulfidizing Agent]

The sulfidizing agent may be, for example, an alkali metal sulfide, an alkali metal hydrosulfide or hydrogen sulfide.

Specific examples of the alkali metal sulfide include lithium sulfide, sodium sulfide, potassium sulfide, rubidium sulfide, cesium sulfide and mixtures of two or more of these alkali metal sulfides. Among them, sodium sulfide is preferably used. Any of these alkali metal sulfides may be used as a hydrate or an aqueous mixture or in the form of an anhydride.

Specific examples of the alkali metal hydrosulfide include sodium hydrosulfide, potassium hydrosulfide, lithium hydrosulfide, rubidium hydrosulfide, cesium hydrosulfide and mixtures of two or more of these alkali metal hydrosulfides. Among them, sodium hydrosulfide is preferably used. Any of these alkali metal hydrosulfides may be used as a hydrate or an aqueous mixture or in the form of an anhydride.

An alkali metal sulfide prepared in situ in a reaction system from an alkali metal hydrosulfide and an alkali metal hydroxide may also be used as the sulfidizing agent. An alkali metal sulfide prepared from an alkali metal hydrosulfide and an alkali metal hydroxide may also be used as the sulfidizing agent.

Additionally, an alkali metal sulfide prepared in situ in a reaction system from an alkali metal hydroxide such as lithium hydroxide or sodium hydroxide and hydrogen sulfide may also be used as the sulfidizing agent. An alkali metal sulfide prepared from an alkali metal hydroxide such as lithium hydroxide or sodium hydroxide and hydrogen sulfide may also be used as the sulfidizing agent.

When there is a partial loss of the sulfidizing agent due to, for example, a dehydration operation prior to a start of polymerization reaction, the supply amount of the sulfidizing agent denotes a remaining amount of the sulfidizing agent determined by subtracting the loss from an actual supply amount.

Besides, an alkali metal hydroxide and/or an alkaline earth metal hydroxide may be used together with the sulfidizing agent. Preferable examples of the alkali metal hydroxide specifically include sodium hydroxide, potassium hydroxide, lithium hydroxide, rubidium hydroxide, cesium hydroxide and mixtures of two or more of these alkali metal hydroxides. Preferable examples of the alkaline earth metal hydroxide specifically include calcium hydroxide, strontium hydroxide and barium hydroxide. Among them, sodium hydroxide is preferably used.

When the alkali metal hydrosulfide is used as the sulfidizing agent, it is especially preferable to use an alkali metal hydroxide simultaneously. The lower limit of the used amount of the alkali metal hydroxide is not less than 0.95 mol, is preferably not less than 1.00 mol and is more preferably not less than 1.005 mol per 1 mol of the alkali metal hydrosulfide. The upper limit of the used amount of the alkali metal hydroxide is not greater than 1.20 mol, is preferably not greater than 1.15 mol and is more preferably not greater than 1.100 mol per 1 mol of the alkali metal hydrosulfide.

[Polymerization Solvent]

An organic polar solvent is preferably used as the polymerization solvent. Specific examples of the organic polar solvent include N-alkyl pyrrolidones such as N-methyl-2-pyrrolidone and N-ethyl-2-pyrrolidone; caprolactams such as N-methyl-∈-caprolactam; aprotic organic solvents such as 1,3,-dimethyl-2-imidazolidinone, N,N-dimethylacetamide, N,N-dimethylformamide, hexamethylphosphoric triamide, dimethyl sulfone and tetramethylene sulfoxide; and mixtures thereof. Any of these polymerization solvents has the high reaction stability and is thus used preferably. Among them, N-methyl-2-pyrrolidone (hereinafter may be abbreviated as NMP) is especially preferably used.

The lower limit of the used amount of the organic polar solvent is not less than 2.0 mol, is preferably not less than 2.25 mol and is more preferably not less than 2.5 mol per 1 mol of the sulfidizing agent. The upper limit of the used amount of the organic polar solvent is not greater than 10 mol, is preferably not greater than 6.0 mol and is more preferably not greater than 5.5 mol per 1 mol of the sulfidizing agent.

[Molecular Weight Modifier]

For the purpose of, for example, forming terminals of the resulting PPS resin, controlling the polymerization reaction or modifying the molecular weight, a monohalogenated compound (not necessarily aromatic compound) may be used with the polyhalogenated aromatic compound described above.

[Polymerization Modifier]

One preferable aspect uses a polymerization modifier, in order to obtain the PPS resin having a relatively high degree of polymerization in a shorter time. The polymerization modifier herein denotes a substance having the function of increasing the viscosity of the resulting PPS resin. Specific examples of this polymerization modifier include organic carboxylates, water, alkali metal chlorides, organic sulfonates, alkali metal sulfates, alkaline earth metal oxides, alkali metal phosphates and alkaline earth metal phosphates. Any of these polymerization modifiers may be used alone, or alternatively two or more of these polymerization modifiers may be used simultaneously. Among them, organic carboxylates, water and alkali metal chlorides are preferable.

More specifically, alkali metal carboxylates are more preferable as the organic carboxylate, and lithium chloride is more preferable as the alkali metal chloride.

The above alkali metal carboxylate is a compound expressed by a general formula $R(COOM)_n$ (in the formula, R represents an alkyl group, a cycloalkyl group, an aryl group, an alkyl aryl group or an aryl alkyl group containing 1 to 20 carbon atoms; M represents an alkali metal selected among lithium, sodium, potassium, rubidium and cesium; and n represents an integral number of 1 to 3). The alkali metal carboxylate may be used as a hydrate, an anhydride or an aqueous solution. Specific examples of the alkali metal carboxylate include lithium acetate, sodium acetate, potassium acetate, sodium propionate, lithium valerate, sodium benzoate, sodium phenylacetate, potassium p-toluate and mixtures thereof.

The alkali metal carboxylate may be obtained by mixing and reacting substantially the same chemical equivalents of an organic acid and one or more compounds selected among the group consisting of alkali metal hydroxides, alkali metal carbonates and alkali metal bicarbonates. Among the above alkali metal carboxylates, the lithium salts have high solubility in the reaction system and significant modifier effects but are expensive. Among the above alkali metal carboxylates, the potassium salts, on the other hand, the rubidium salts and the cesium salts are likely to have insufficient solubility in the reaction system. Accordingly, sodium acetate that is less expensive and has moderate solubility in the polymerization system is most preferably used.

The lower limit of the amount of any of these alkali metal carboxylates used as the polymerization modifier is generally not less than 0.01 mol, and is preferably not less than 0.1 mol and more preferably not less than 0.2 mol per 1 mol of the supply amount of the alkali metal sulfide in order to achieve the higher degree of polymerization. The upper limit of the amount of any of these alkali metal carboxylates used as the polymerization modifier is generally not greater than 2 mol, and is preferably not greater than 0.6 mol and more preferably not greater than 0.5 mol per 1 mol of the supply amount of the alkali metal sulfide in order to achieve the higher degree of polymerization.

The lower limit of the added amount of water used as the polymerization modifier is generally not less than 0.3 mol, and is preferably not less than 0.6 mol and more preferably not less than 1 mol per 1 mol of the supply amount of the alkali metal sulfide in order to achieve the higher degree of polymerization. The upper limit of the added amount of water used as the polymerization modifier is generally not greater than 15 mol, and is preferably not greater than 10 mol and more preferably not greater than 5 mol per 1 mol of the supply amount of the alkali metal sulfide in order to achieve the higher degree of polymerization.

It is also allowed as a matter of course to use two or more of these polymerization modifiers in combination. For example, using an alkali metal carboxylate and water together achieves a higher degree of polymerization by the smaller required amounts of the alkali metal carboxylate and water.

The timing of addition of any of these polymerization modifiers is not especially specified but may be any time at a pre-processing step, at the start of polymerization or in the middle of polymerization described later, and the polymerization modifier may be added in a plurality of additions. When an alkali metal carboxylate is used as the polymerization modifier, it is preferable to add the alkali metal carboxylate at once at the start of the pre-processing step or at the start of polymerization, in the light of easy addition.

When water is used as the polymerization modifier, on the other hand, it is effective to add water in the middle of the polymerization reaction after supplying the polyhalogenated aromatic compound.

[Polymerization Stabilizer]

A polymerization stabilizer may be used, in order to stabilize the polymerization reaction system and prevent side reactions. The polymerization stabilizer contributes to stabilizing the polymerization reaction system and suppresses undesired side reactions. One indication of the side reaction is generation of thiophenol. Addition of the polymerization stabilizer suppresses generation of thiophenol. Specific examples of the polymerization stabilizer are compounds such as alkali metal hydroxides, alkali metal carbonates, alkaline earth metal hydroxides and alkaline earth metal carbonates. Among them, alkali metal hydroxides such as sodium hydroxide, potassium hydroxide and lithium hydroxide are preferable. The alkali metal carboxylate described above also acts as the polymerization stabilizer and is thus to be included as one of the polymerization stabilizers. When the alkali metal hydrosulfide is used as the sulfidizing agent, it is especially preferable to use an alkali metal hydroxide simultaneously as described above. An excess of the alkali metal hydroxide relative to the sulfidizing agent may also serve as the polymerization stabilizer.

Any of these polymerization stabilizers may be used alone, or alternatively two or more of these polymerization stabilizers may be used in combination. The lower limit of the used amount of the polymerization stabilizer is generally not less than 0.02 mol, is preferably not less than 0.03 mol and is more preferably not less than 0.04 mol per 1 mol of the supply amount of the alkali metal sulfide. The upper limit of the used amount of the polymerization stabilizer is generally not greater than 0.2 mol, is preferably not greater than 0.1 mol and is more preferably not greater than 0.09 mol per 1 mol of the supply amount of the alkali metal sulfide. The smaller ratio has insufficient stabilization effects. The excessively large ratio is, on the other hand, economically disadvantageous and is likely to reduce the polymer yield.

The timing of addition of the polymerization stabilizer is not especially specified but may be any time at the pre-processing step, at the start of polymerization or in the middle of polymerization described later, and the polymerization stabilizer may be added in a plurality of additions. It is, however, preferable to add the polymerization stabilizer at once at the start of the pre-processing step or at the start of polymerization, in the light of easy addition.

The following specifically and sequentially describes a pre-processing step, a polymerization reaction step, a recovery step and a post-processing step with respect to a preferable production method of the PPS resin used according to the embodiment of the invention. The invention is, however, not limited to this method in any sense.

[Pre-Processing Step]

In the production method of the PPS resin, the sulfidizing agent is generally used in the form of a hydrate. It is here preferable to raise the temperature of a mixture including the organic polar solvent and the sulfidizing agent and remove an excess amount of water out of the system, prior to addition of the polyhalogenated aromatic compound.

The sulfidizing agent used may be a sulfidizing agent prepared in situ in the reaction system from an alkali metal hydrosulfide and an alkali metal hydroxide or may be a sulfidizing agent prepared from an alkali metal hydrosulfide and an alkali metal hydroxide in a different tank separate from a polymerization tank as described above. The procedure employed for such preparation is not specifically limited, but one applicable procedure may add the alkali metal hydrosulfide and the alkali metal hydroxide to the organic polar solvent under an inert gas atmosphere in a temperature range of ordinary temperature to 150° C. or preferably in a temperature range of ordinary temperature to 100° C., raise the temperature to at least 150° C. or higher or preferably to 180 to 260° C. under ordinary pressure or under reduced pressure, so as to remove water. The polymerization modifier may be added in this stage. The reaction may be performed with addition of, for example, toluene, in order to facilitate removal of water.

The water content in the polymerization system during the polymerization reaction is preferably 0.3 to 10.0 mol per 1 mol of the supply amount of the sulfidizing agent. The water content in the polymerization system herein is an amount determined by subtracting the amount of water removed out of the polymerization system from the amount of water supplied to the polymerization system. The water supplied may be in any form, such as water, an aqueous solution or water of crystallization.

[Polymerization Reaction Step]

The PPS resin is produced by reaction of the sulfidizing agent and the polyhalogenated aromatic compound in the organic polar solvent in a temperature range of not lower than 200° C. but lower than 290° C.

At the start of the polymerization reaction step, the organic polar solvent, the sulfidizing agent and the polyhalogenated aromatic compound are mixed preferably under an inert gas atmosphere in a temperature range of ordinary temperature to 240° C. or preferably in a temperature range of 100° C. to 230° C. The polymerization modifier may be added in this stage. These raw materials may be supplied in a random order or may be supplied simultaneously.

This mixture is generally heated to a range of 200° C. to 290° C. The rate of temperature rise is not specifically limited, but the rate of temperature rise selected is generally the rate of 0.01 to 5° C./minute and is more preferably 0.1 to 3° C./minute.

In general, the mixture is eventually heated to the temperature of 250 to 290° C. and is subjected to the reaction at this temperature generally for 0.25 to 50 hours or preferably for 0.5 to 20 hours.

A method of raising the temperature to 270 to 290° C. after the reaction for a predetermined time at, for example, 200 to 260° C. at the stage prior to reaching to the final temperature is effective to achieve the higher degree of polymerization. In this application, the reaction time selected for the reaction at 200 to 260° C. is generally a range of 0.25 hours to 20 hours and is preferably a range of 0.25 to 10 hours.

Additionally, in some cases, multi-stage polymerization may be effective to obtain a polymer having the higher degree of polymerization. In the application of multi-stage polymerization, it is advantageous that the process goes on to a next polymerization stage at the time when the conversion ratio of the polyhalogenated aromatic compound in the system at 245° C. reaches 40 mol % or higher or preferably 60 mol %.

The conversion ratio of the polyhalogenated aromatic compound (may be abbreviated as PHA) is a value calculated by the following equations. The remaining amount of PHA is determinable by gas chromatography.

(A) In the case of addition of an excess in molar ratio of the polyhalogenated aromatic compound relative to the alkali metal sulfide:

Conversion ratio=[supply amount of PHA (mol)−
remaining amount of PHA (mol)]/[supply
amount of PHA (mol)−excessive amount of
PHA (mol)]

(B) In the case other than the above case (A):

Conversion ratio=[supply amount of PHA (mol)−
remaining amount of PHA (mol)]/[supply
amount of PHA (mol)]

[Recovery Step]

In the production method of the PPS resin, a solid substance is recovered from a polymerization reactant including a polymer and the solvent after the end of polymerization. Any of known recovery techniques may be employed as the method of recovery.

The recovery method employed may be, for example, method of slowly cooling down the polymerization reactant after the end of the polymerization reaction for recovery of a particulate polymer. The slow cooling rate in this application is not specifically limited but is generally about 0.1° C./minute to 3° C./minute. There is no need to slowly cool down the polymerization reactant at a constant speed over the entire slow cooling step. For example, an employed method may slowly cool down the polymerization reactant at the slow cooling rate of 0.1 to 1° C./minute until crystallization and deposition of the polymer particles and then slowly cool down the polymerization reactant at the slow cooling rate of not lower than 1° C./minute.

One preferable procedure performs the above recovery under a rapid cooling condition. One preferable technique employed for the recovery method may be a flushing technique. The flushing technique flushes the polymerization reactant from the state of high temperature and high pressure (generally not lower than 250° C. and not less than 8 kg/cm²) into an atmosphere of ordinary pressure or reduced pressure and thereby recovers the polymer in the powdery form simultaneously with recovery of the solvent. Flushing herein means ejecting the polymerization reactant from a nozzle. The atmosphere into which the polymerization reactant is flushed is, for example, nitrogen or water vapor in ordinary pressure, and the range of 150° C. to 250° C. is generally selected as the flushing temperature.

[Post-Processing Step]

The PPS resin may be subject to acid treatment, hot water treatment or washing with an organic solvent after production through the polymerization reaction step and the recovery step described above.

The acid treatment may be performed as described below. The acid used for acid treatment of the PPS resin is not specifically limited but may be any acid without the action of degrading the PPS resin. Available examples of the acid include acetic acid, hydrochloric acid, sulfuric acid, phosphoric acid, silicic acid, carbonic acid and propionic acid. Among them, acetic acid and hydrochloric acid are used more preferably. An acid that degrades or deteriorates the PPS resin, such as nitric acid is, however, undesirable.

The method employed for acid treatment is, for example, a method of soaking the PPS resin in an acid or an acid aqueous solution, with adequately stirring or heating as appropriate. For example, when acetic acid is used, sufficient effects are achieved by soaking the powder of PPS resin in an acetic acid aqueous solution of pH 4 heated to 80 to 200° C. and stirring the resin-soaked solution for 30 minutes. The pH after the acid treatment may be not lower than 4 and may be, for example, in the range of about pH 4 to 8. The PPS resin subjected to the acid treatment is preferably washed with cold water or warm water several times for removal of the remaining acid or salt. The water used for washing is preferably distilled water or deionized water, since distilled water or deionized water does not deteriorate the effects of desired chemical modification of the PPS resin by acid treatment.

The hot water treatment may be performed as described below. In the process of hot water treatment of the PPS resin, the temperature of hot water is not lower than 100° C., is more preferably not lower than 120° C., is furthermore preferably not lower than 150° C. and is especially preferably not lower than 170° C. The temperature of lower than 100° C. gives little effects of desired chemical modification of the PPS resin and is thus undesirable.

In order to achieve the effects of desired chemical modification of the PPS resin by hot water treatment, the water used is preferably distilled water or deionized water. The procedure of hot water treatment is not specifically limited. The procedure employed for hot water treatment is, for example, a method of heating a predetermined amount of the PPS resin in a predetermined amount of water with stirring in a pressure vessel or a method of continuously performing hot water treatment. As the ratio of the PPS resin to water, the greater portion of water is preferable. The liquor ratio of not greater than 200 g of the PPS resin to 1 liter of water is generally selected.

Since degradation of terminal groups is undesirable, the atmosphere for the treatment is preferably an inert atmosphere, in order to avoid such degradation. Additionally, it is preferable to wash the PPS resin subjected to this hot water treatment with warm water several times for removal of the remaining components.

The organic solvent washing may be performed as described below. The organic solvent used for washing the PPS resin is not specifically limited but may be any organic solvent without the action of degrading the PPS resin. Available examples include nitrogen-containing polar solvents such as N-methyl-2-pyrrolidone, dimethylformamide, dimethylacetamide, 1,3-dimethylimidazolidinone, hexamethylphosphoramide and piperazinones; sulfoxide/sulfone solvents such as dimethyl sulfoxide, dimethyl sulfone and sulfolane; ketone solvents such as acetone, methyl ethyl ketone, diethyl ketone and acetophenone; ether solvents such as dimethyl ether, dipropyl ether, dioxane and tetrahydrofuran; halogen solvents such as chloroform, methylene chloride, trichloroethylene, ethylene dichloride, perchloroethylene, monochloroethane, dichloroethane, tetrachloroethane, perchloroethane and chlorobenzene; alcohol/phenol solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene and xylene. Among these organic solvents, it is especially preferable to use, for example, N-methyl-2-pyrrolidone, acetone, dimethylformamide and chloroform. Additionally, any of these organic solvents may be used alone or alternatively may be used as a mixture of two or more of the organic solvents.

The method employed for organic solvent washing is, for example, a method of soaking the PPS resin in the organic solvent, with adequately stirring or heating as appropriate. The washing temperature during washing of the PPS resin with the organic solvent is not specifically limited, but any temperature may be selected in the range of ordinary temperature to about 300° C. The higher washing temperature is likely to have the higher washing efficiency, but the washing temperature of ordinary temperature to 150° C. generally achieves the sufficient effects. Another method employed may wash the PPS resin under pressure in a pressure vessel at the temperature of not lower than the boiling point of the organic solvent. The washing time is also not specifically limited. The washing time depends on the washing conditions, but washing for not shorter than 5 minutes generally achieves the sufficient effects in batch washing. Continuous washing may alternatively be employed.

The PPS resin used according to the embodiment of the invention may be a PPS resin with an alkali metal or an alkaline earth metal such as Ca introduced thereon. The method employed for introducing the alkali metal or the alkaline earth metal may be, for example, a method of adding an alkali metal salt or an alkaline earth metal salt prior to, during or after the pre-processing step described above, a method of adding an alkali metal salt or an alkaline earth metal salt in a polymerization tank prior to, during or after the polymerization step described above, or a method of adding an alkali metal salt or an alkaline earth metal salt at an initial stage, a middle stage or a final stage of the washing step described above. Among them, the simplest method is a procedure of adding an alkali metal salt or an alkaline earth metal salt after removal of the remaining oligomers and the remaining salts by washing with an organic solvent or by washing with warm water or hot water. It is preferable to introduce the alkali metal or the alkaline earth metal into the PPS resin in the form of an alkali metal ion or an alkaline earth metal ion such as an acetate, a hydroxide or a carbonate. It is also preferable to remove an excess of the alkali metal salt or the alkaline earth metal salt by, for example, warm water washing. The concentration of the alkali metal ion or the alkaline earth metal ion for introduction of the alkali metal or the alkaline earth metal described above is preferably not less than 0.001 mmol and is more preferably not less than 0.01 mmol per 1 g of the PPS resin. The temperature is preferably not lower than 50° C., is more preferably not lower than 75° C. and is especially preferably not lower than 90° C. The upper limit temperature is not specifically restricted but is, in general, preferably not higher than 280° C. in terms of the operability. The liquor ratio (ratio of the weight of washing liquid to the dry weight of PPS resin) is preferably not less than 0.5, is more preferably not less than 3 and is furthermore preferably not less than 5.

The PPS resin may be further subjected to high polymerization by thermal oxidative cross-linking treatment, which includes heating under an oxygen atmosphere after completion of polymerization and heating with addition of a cross-linking agent such as a peroxide.

When dry heat treatment is performed for the purpose of high polymerization by thermal oxidative cross-linking, the lower limit temperature is preferably not lower than 160° C. and is more preferably not lower than 170° C. The upper limit temperature is preferably not higher than 260° C. and is more preferably not higher than 250° C. The oxygen concentration is preferably not less than 5% by volume and is more preferably not less than 8% by volume. The upper limit of the oxygen concentration is not specifically restricted, but about 50% by volume is generally the limit. The lower limit of the processing time is preferably not shorter than 0.5 hours, is more preferably not shorter than 1 hour and is furthermore preferably not shorter than 2 hours. The upper limit of the processing time is preferably not longer than 100 hours, is more preferably not longer than 50 hours and is furthermore preferably not longer than 25 hours. The device used for such heat treatment may be a general hot air drying machine, a rotary heating device or a heating device with stirring blades. It is preferable to use the rotary heating device or the heating device with stirring blades, in order to achieve efficient and more homogeneous treatment.

The dry heat treatment may be performed for the purpose of suppressing thermal oxidative cross-linking and removing the volatile component. The temperature is preferably 130 to 250° C. and is more preferably in the range of 160 to 250° C. The oxygen concentration in this case is preferably less than 5% by volume and is more preferably less than 2% by volume. The lower limit of the processing time is preferably not shorter than 0.5 hours and is more preferably not shorter than 1 hour. The upper limit of the processing time is preferably not longer than 50 hours, is more preferably not longer than 20 hours and is furthermore preferably not longer than 10 hours. The device used for such heat treatment may be a general hot air drying machine, a rotary heating device or a heating device with stirring blades. It is preferable to use the rotary heating device or the heating device with stirring blades, in order to achieve efficient and more homogeneous treatment.

(2) (b) Fluororesin

The fluororesin used according to the embodiment of the invention is one or more fluororesins selected among a tetrafluoroethylene/hexafluoropropylene copolymer, an ethylene/tetrafluoroethylene copolymer and a tetrafluoroethylene/perfluoro(alkyl vinyl ether) copolymer.

With regard to the amount of the fluororesin added according to the embodiment of the invention, the total amount of one or more fluororesins selected among the tetrafluoroethylene/hexafluoropropylene copolymer, the ethylene/tetrafluoroethylene copolymer and the tetrafluoroethylene/perfluoro(alkyl vinyl ether) copolymer is generally not less than 80 parts by weight and is more preferably not less than 90 parts by weight relative to 100 parts by weight of the PPS resin. The total amount is generally not greater than 250 parts by weight and is more preferably not greater than 200 parts by weight. The total amount of the fluororesin greater than 250 parts by weight has difficulty in forming a phase-separated structure including a continuous phase of the PPS resin and dispersed phases of the fluororesin and undesirably deteriorates the excellent heat resistance and mechanical properties of the PPS resin. The total amount of the fluororesin less than 80 parts, on the other hand, undesirably reduces the effect of achieving desired electrical properties. Using two or more different fluororesins in combination leads to increasing the total amount of the fluororesins added and effectively provides the resulting PPS resin composition with the electrical properties and the slidability of the fluororesin.

The upper limit of the melting point of the fluororesin used in the embodiment of the invention is preferably not higher than 340° C., is more preferably not higher than 310° C. and is furthermore preferably not higher than 280° C. The lower limit of the melting point is preferably not lower than 150° C. and is more preferably not lower than 190° C., in terms of the heat resistance of the fluororesin at the processing temperature of the PPS resin. The fluororesin having the melting point of higher than 340° C. leads to requiring the higher temperature in melt-kneading. This may cause degradation of the PPS resin and deteriorate the mechanical properties. The melting point is thus preferably not higher than 340° C.

An MFR (melt flow rate) of the fluororesin used in the embodiment of the invention is preferably 0.1 to 300 g/10 minutes and is more preferably 0.1 to 100 g/10 minutes. The MFR in the above range is preferable for formation of the desired phase-separated structure. The MFR below this range is likely to deteriorate the extrusion processability, while the MFR above this range is likely to deteriorate the mechanical properties.

With regard to the tetrafluoroethylene/perfluoro(alkyl vinyl ether) copolymer, the above MFR is defined as an amount (g/10 minutes) passing through a nozzle of 2 mm in diameter and 10 mm in length for 10 minutes under 5 kg load at 372° C. in conformity with ASTM-D3307 (2010). With regard to the tetrafluoroethylene/hexafluoropropylene copolymer, the MFR is defined as an amount similarly passing through the nozzle under 5 kg load at 372° C. in conformity with ASTM-D2116 (2007). With regard to the ethylene/tetrafluoroethylene copolymer, the MFR is defined as an amount similarly passing through the nozzle under 5 kg load at 297° C. in conformity with ASTM-D3159 (2010).

The fluororesin used in the embodiment of the invention does not contain a functional group in principle, because of reasons such as an increase in melt viscosity or a decrease in processability of the resulting resin composition and a cost increase. A fluororesin partly containing a functional group may be used in combination with the functional group-free fluororesin. The functional group-containing fluororesin enhances the compatibility of the PPS resin or another resin with the fluororesin and is effective for controlling the desired phase-separated structure and stabilizing the structure in melt retention. The functional group is, for example, vinyl group, epoxy group, styryl group, methacrylic group, acrylic group, amino group, ureido group, mercapto group, sulfide group, isocyanate group or carbonyl group.

(3) (c) Silane Coupling Compound

Adding a silane coupling compound to the PPS resin composition according to the embodiment of the invention is useful for enhancing the affinity of the PPS resin for the tetrafluoroethylene/hexafluoropropylene copolymer, the ethylene/tetrafluoroethylene copolymer or the tetrafluoroethylene/perfluoro(alkyl vinyl ether) copolymer and is effective for stabilizing the phase-separated structure of the embodiment that forms secondary dispersed phases in primary dispersed phases and improving the mechanical strength.

In terms of improvement of the affinity between the resins, the silane coupling compound added is preferably a silane coupling compound containing at least one functional group selected among isocyanate group, epoxy group and amino group. Such a silane compound is expected to be reactive to the PPS resin. Concrete examples of the silane coupling agent include isocyanate group-containing alkoxysilane compounds such as γ-isocyanate propyl triethoxysilane, γ-isocyanate propyl trimethoxysilane, γ-isocyanate propyl methyldimethoxysilane, γ-isocyanate propyl methyldiethoxysilane, γ-isocyanate propyl ethyldimethoxysilane, γ-isocyanate propyl ethyldiethoxysilane and γ-isocyanate propyl trichlorosilane; epoxy group-containing alkoxysilane compounds such as γ-glycidoxy propyl trimethoxysilane, γ-glycidoxy propyl triethoxysilane and β-(3,4-epoxycyclohexyl)ethyl trimethoxysilane; and amino group-containing alkoxysilane compounds such as γ-(2-aminoethyl)aminopropyl methyldimethoxysilane, γ-(2-aminoethyl)aminopropyl trimethoxysilane and γ-aminopropyl trimethoxysilane. The amount of the silane coupling compound added is preferably not less than 0.1 parts by weight and more preferably not less than 0.2 parts by weight as the lower limit, and is preferably not greater than 5 parts by weight and more preferably not greater than 3 parts by weight as the upper limit, relative to 100 parts by weight of the PPS resin.

(4) Other Additives

Additionally, a resin other than the tetrafluoroethylene/hexafluoropropylene copolymer, the ethylene/tetrafluoroethylene copolymer and the tetrafluoroethylene/perfluoro (alkyl vinyl ether) copolymer may be added to and mixed with the PPS resin composition according to the embodiment of the invention in such a range that does not damage the advantageous effects of the embodiment of the invention. Specific examples of this resin include polyolefin resin, polybutylene terephthalate resin, polyethylene terephthalate resin, polyamide resin, modified polyphenylene ether resin, polysulfone resin, polyarylsulfone resin, polyketone resin, polyether imide resin, polyarylate resin, liquid crystal polymer, polyethersulfone resin, polyether ketone resin, polythioether ketone resin, poly(ether ether ketone) resin, polyimide resin, polyamide imide resin, and polytetrafluoroethylene resin.

The following compounds may further be added for the purpose of modification: plasticizers such as polyalkylene oxide oligomer-based compounds, thioether-based compounds, ester-based compounds and organophosphorus-based compounds; crystal nucleating agents such as talc, kaolin, organophosphorus compounds and poly(ether ether ketone); metal soaps such as montanic acid waxes, lithium stearate and aluminum stearate; mold release agents such as ethylene diamine-stearic acid-sebacic acid polycondensates and silicone-based compounds; coloring inhibitors such as hypophosphites; and other conventional additives including lubricants, ultraviolet absorbers, coloring agents and foaming agents. In order to prevent the intrinsic properties of the PPS resin from being deteriorated, the content of any of the above compounds is preferably not higher than 20% by weight, is more preferably not higher than 10% by weight and is furthermore preferably not higher than 1% of the entire composition.

(5) Production Method of Resin Composition

A typical production method of melt-kneading supplies at least (a) the PPS resin and (b) one or more copolymers selected among the tetrafluoroethylene/hexafluoropropylene copolymer, the ethylene/tetrafluoroethylene copolymer and the tetrafluoroethylene/perfluoro(alkyl vinyl ether) copolymer to a twin-screw extruder and melt-kneads the mixture at a processing temperature in a range of the melting points of the (a) the PPS resin and (b) the fluororesin +5 to 100° C. A relatively high shear force is required to achieve fine dispersion of the fluororesin and formation of secondary dispersed phases of another component in primary dispersed phases of the fluororesin. More specifically, the method preferably uses a twin-screw extruder, more preferably uses a twin-screw extruder with two or more kneading sections and furthermore preferably uses a twin-screw extruder with three or more kneading sections. The upper limit of the number of kneading sections depends on the balance between the length of each kneading section and the interval between kneading sections but is preferably not greater than 10 and more preferably not greater than 8. The twin-screw extruder has "L/D" (L represents a screw length and D represents a screw diameter) of preferably not less than 10, more preferably not less than 20 and furthermore preferably not less than 30. The upper limit of L/D of the twin-screw extruder is generally 60. The lower limit of the peripheral velocity is preferably not lower than 15 m/minute and is more preferably not lower than 20 m/minute. The upper limit of the peripheral velocity is preferably not higher than 50 m/minute and is more preferably not higher than 40 m/minute. The twin-screw extruder having L/D of less than 10 is likely to cause insufficient kneading. This decreases the dispersibility of the fluororesin and is thus unlikely to produce the dispersed structure of the fluororesin specified according to the embodiment of the invention and thereby produce the PPS resin composition having the good balance among the mechanical strength, the electrical properties and the heat resistance. The twin-screw extruder having less than two kneading sections or having the peripheral velocity of lower than 15 m/minute decreases the dispersibility of the fluororesin accompanied with a decrease in shear force and is thus unlikely to provide the desired physical properties. The twin-screw extruder having the peripheral velocity of not higher than 50 m/minute, on the other hand, suppresses the load applied to the twin-screw extruder and is thus advantageous to the productivity.

According to the embodiment of the invention, in order to achieve finer dispersion of the fluororesin, the ratio of the total length of the kneading sections to the full length of the screw of the extruder is preferably not lower than 10%, more preferably not lower than 15% and furthermore preferably not lower than 20% as the lower limit, while being preferably not higher than 60%, more preferably not higher than 55% and furthermore preferably not higher than 50% as the upper limit. The ratio of the total length of the kneading sections to the full length of lower than 10% is likely to cause insufficient kneading and decrease the dispersibility of the fluororesin and is thus unlikely to obtain the PPS resin composition having the good balance among the mechanical strength, the electrical properties and the heat resistance. The ratio of the total length of the kneading sections to the full length of higher than 60%, on the other hand, causes heat generation by excessive shear to increase the resin temperature and is thus likely to cause degradation of the kneaded resin.

In the embodiment of the invention, in terms of the kneading performance to provide a desired resin phase-separated structure, "Lk/D" is preferably not less than 0.1, more preferably not less than 1 and furthermore preferably not less than 2 as the lower limit, while being preferably not greater than 10, more preferably not greater than 8 and furthermore preferably not greater than 6 as the upper limit, where "Lk" represents a length of one kneading section in the screw of the extruder and "D" represents a screw diameter.

In the embodiment of the invention, in terms of suppressing excessive heat generation of the molten resin by shear at the successive kneading sections, "Ld/D" is preferably not less than 0.5, more preferably not less than 1 and furthermore preferably not less than 2 as the lower limit, while being preferably not greater than 10, more preferably not greater than 8 and furthermore preferably not greater than 6 as the upper limit, where "Ld" represents an interval between kneading sections in the screw of the extruder and "D" represents a screw diameter.

The resin temperature during mixing is the range of the melting points of (a) the PPS resin and (b) the fluororesin +5 to 100° C. as described above and is more preferably in the range of +10 to 70° C. More specifically, the resin temperature during mixing is preferably not higher than 350° C. and is more preferably not higher than 340° C. The kneading temperature of lower than the melting points of the PPS resin and the fluororesin +5° C. significantly increases the viscosity of the resulting composition due to the presence of partly unmelted PPS resin or fluororesin and increases the load applied to the twin-screw extruder, thus being disadvantageous to the productivity. The resulting composition is also unlikely to have a desired resin phase-separated structure. The kneading temperature of higher than the melting points of the PPS resin and the fluororesin +100° C. is, on the other hand, likely to cause degradation of the kneaded resin or the additive, thus being disadvantageous.

As described above, a relatively high shear force is required to provide the desired resin phase-separated structure. The high shear force, however, simultaneously generates a large amount of heat to increase the resin temperature and cause degradation of the kneaded resin. There is accordingly a need to suppress shear-induced heat generation during melt-kneading with the twin-screw extruder. A specific method employed may melt-knead the resin using a screw arrangement including a stirrer screw with cutouts. The "cutout" herein denotes a portion formed by partly cutting out crests of a screw flight. The stirrer screw with cutouts is likely to increase the resin filling ratio, and the molten resin passing through a kneading section that is linked with the stirrer screw with cutouts is susceptible to the cylinder temperature of the extruder. The molten resin heated by shear during kneading is thus efficiently cooled down by the stirrer screw with cutouts, so that the resin temperature is likely to be decreased. Unlike the conventional technique of grinding the resin, the stirrer screw with cutouts achieves kneading mainly by stirring and mixing. This suppresses degradation of the resin by heat generation and is likely to provide the desired resin phase-separated structure described later.

In terms of improving the cooling efficiency of the molten resin by resin-filling and improving the kneading performance, the stirrer screw with cutouts is preferably a stirrer screw with cutouts configured such that the length of screw pitch is 0.1 to 0.3D and the number of cutouts per pitch is 10 to 15, where D represents a screw diameter. The "length of screw pitch" herein denotes a length between crests of the screw when the screw is rotated by 360 degrees.

In the embodiment of the invention, in order to provide the desired resin phase-separated structure, the ratio of the total length of the stirrer screw with cutouts to the full length of the screw of the extruder is preferably not lower than 3% and more preferably not lower than 5% of L/D described above, while being preferably not higher than 20% and more preferably not higher than 15% of L/D described above.

The sequence of mixing the raw materials is not specifically limited. Any of the following methods may be employed: a method of mixing all raw materials and subsequently melt-kneading the mixture by the procedure described above, a method of mixing part of raw materials, melt-kneading the mixture by the procedure described above, adding residual raw materials to the mixture and subsequently further melt-kneading the resulting mixture, or a method of mixing part of raw materials and subsequently adding residual raw materials using a side feeder during melt-kneading with a single-screw extruder or a twin-screw extruder. In any case, in terms of providing a desired dispersed structure, it is preferable to use a twin-screw extruder having "L/D" of not less than 10 and including a stirrer screw with cutouts as 3 to 20% of this L/D, in the presence of the PPS resin and the fluororesin. The twin-screw extruder preferably has two or more kneading sections and has the peripheral velocity set to 15 to 50 m/minute. With regard to small amounts of additive components, after the other components are kneaded by the above method to be pelletized, the additive components may be added to non-molded pellets and subsequently subjected to molding.

(6) Polyphenylene Sulfide Resin Composition

Figure 1:
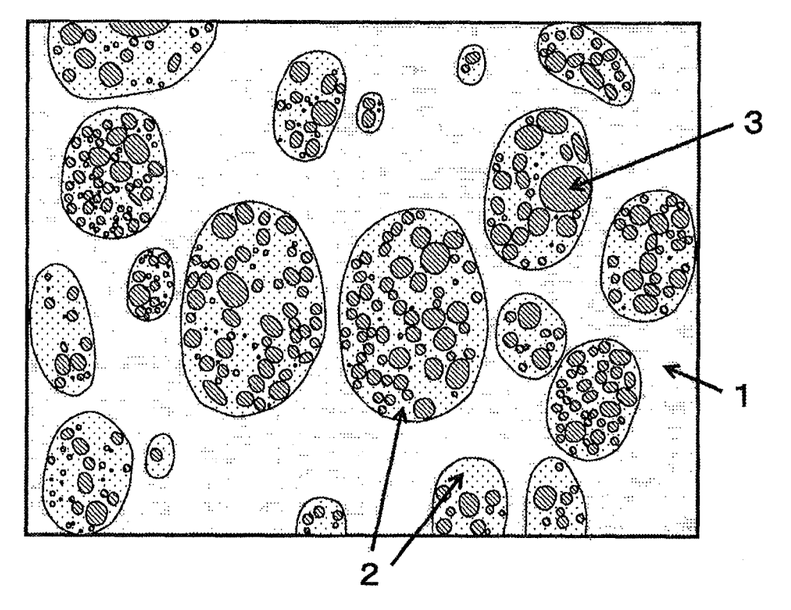
FIG. 1 is a diagram illustrating a phase-separated structure formed by a PPS resin and one or more copolymers selected among tetrafluoroethylene/hexafluoropropylene copolymer, ethylene/tetrafluoroethylene copolymer and tetrafluoroethylene/perfluoro(alkyl vinyl ether) copolymer.

The PPS resin composition according to the embodiment of the invention has excellent electrical properties, as well as excellent mechanical properties and heat resistance which the PPS rein intrinsically has. In order to provide the PPS resin composition with such properties, the PPS resin composition is required to have such a resin phase-separated structure observed with an electron microscope that (a) the PPS resin forms a continuous phase (sea phase or matrix), that (b) one copolymer selected among the tetrafluoroethylene/hexafluoropropylene copolymer, the ethylene/tetrafluoroethylene copolymer and the tetrafluoroethylene/perfluoro(alkyl vinyl ether) copolymer forms primary dispersed phases (island phases, domains), and that the primary dispersed phase formed by the (b) component in the composition includes secondary dispersed phases of a different component from the (b) component, as shown in FIG. 1. The component of the included secondary dispersed phases may be, for example, the PPS resin or a fluororesin other than the fluororesin forming the primary dispersed phases and is preferably a component that does not chemically react with the (b) component. Formation of the above resin phase-separated structure by formation of a continuous phase of the PPS resin and good dispersion of the high composition of the fluororesin provides the PPS resin composition with excellent electrical properties without damaging the excellent mechanical strength and heat resistance which the PPS resin intrinsically has.

HIPS (high impact polystyrene) or ABS resin (acrylonitrile-butadiene-styrene copolymer synthetic resin) forms a so-called salami structure as the similar structure. In order to obtain this structure, there is a need to polymerize a monomer as one component in the presence of a polymer as the other component and form a graft or block copolymer of both the components by reaction. The combination of the polyphenylene sulfide resin with one copolymer selected among the tetrafluoroethylene/hexafluoropropylene copolymer, the ethylene/tetrafluoroethylene copolymer and the tetrafluoroethylene/perfluoro(alkyl vinyl ether) copolymer according to the embodiment is, however, not producible by the above procedure including polymerization. It has been found for the first time that the phase-separated structure shown in FIG. 1 is obtained by the melt-kneading method according to the embodiment of the invention.

In the phase-separated structure of the PPS resin composition according to the embodiment of the invention, the area ratio of secondary dispersed phases to primary dispersed phases is preferably not lower than 5%, is more preferably not lower than 15% and is furthermore preferably not lower than 25%. In the phase-separated structure of the PPS resin composition, the lower limit of the number-average dispersion particle size in the secondary dispersed phases included in the primary dispersed phases is preferably not less than 0.01 µm, is more preferably not less than 0.05 µm, is furthermore preferably not less than 0.1 µm and is especially preferably not less than 0.3 µm. In the phase-separated structure of the PPS resin composition, the upper limit of the number-average dispersion particle size in the secondary dispersed phases included in the primary dispersed phases is preferably not greater than 2 µm, is more preferably not greater than 1.5 µm, is furthermore preferably not greater than 1.0 µm and is especially preferably not greater than 1.0 µm.

In the phase-separated structure of the PPS resin, the lower limit of the maximum dispersion particle size in the secondary dispersed phases included in the primary dispersed phases is preferably not less than 0.3 µm and is more preferably not less than 0.5 µm. In the phase-separated structure of the PPS resin, the upper limit of the maximum dispersion particle size in the secondary dispersed phases included in the primary dispersed phases is preferably not greater than 5.0 µm and is more preferably not greater than 3.0 µm.

In the phase-separated structure of the PPS resin, the lower limit of the minimum dispersion particle size in the secondary dispersed phases included in the primary dispersed phases is preferably not less than 0.01 µm, is more preferably not less than 0.1 µm and is furthermore preferably not less than 0.12 µm. In the phase-separated structure of the PPS resin, the upper limit of the minimum dispersion particle size in the secondary dispersed phases included in the primary dispersed phases is preferably not greater than 0.5 µm, is more preferably not greater than 0.4 µm and is furthermore preferably not greater than 0.3 µm.

The area ratio, the number-average dispersion particle size and the maximum and minimum dispersion particle sizes in the above ranges indicates the high affinity between the PPS resin ad the fluororesin and advantageously leads to the high mechanical strength.

The "area ratio of secondary dispersed phases to primary dispersed phases" is calculated by the following procedure. An ASTM bending test piece is molded at a molding temperature of the melting points of the PPS resin and the fluororesin +20 to 40° C. A thin piece of not greater than 0.1 µm in thickness is cut out from the center of the dumbbell test piece in a direction of the sectional area of the dumbbell test piece and is photographed at 1000-fold to 5000-fold magnification with a transmission electron microscope. In the photograph, with respect to any 100 primary dispersed phases, an area (Sb) of the fluororesin forming the primary dispersed phases and an area (Sx) of secondary dispersed phases included in the primary dispersed phases are determined by the cutout weight method, and the area ratio is then determined in percentage by an equation of $(Sx)/((Sb)+(Sx))$.

The "number-average dispersion particle size in the secondary dispersed phases" is a number-average value calculated from average values of the measurement results of the maximum diameter and the minimum diameter with regard to secondary dispersed phases included in any 100 primary dispersed phases selected in observation with a transmission electron microscope by the same method as described above.

The "maximum and minimum dispersion particle sizes in the secondary dispersed phases" are obtained from the measurement results of the maximum diameter and the minimum diameter with regard to secondary dispersed phases included in any 100 primary dispersed phases selected in observation with a transmission electron microscope by the same method as described above.

In the phase-separated structure of the PPS resin composition according to the embodiment of the invention, the lower limit of a variation in number-average dispersion particle size in primary dispersed phases before and after melt retention is preferably not lower than −20%, is more preferably not lower than −10% and is furthermore preferably not lower than −5%. The upper limit of the variation in number-average dispersion particle size in primary dispersed phases before and after melt retention is preferably not higher than 60%, is more preferably not higher than 35% and is furthermore preferably not higher than 25%.

The variation in number-average dispersion particle size in primary dispersed phases before and after melt retention in the above range indicates the stable phase-separated structure in the composition melting state in the molding process and advantageously leads to no substantial change in physical properties of the resulting molded PPS resin composition before and after melt retention.

The "variation in number-average dispersion particle size in primary dispersed phases before and after melt retention" is calculated by the following procedure. An ASTM bending test piece is molded at a molding temperature of the melting points of the PPS resin and the fluororesin +20 to 40° C. A thin piece of not greater than 0.1 µm in thickness is cut out from the center of the dumbbell test piece in a direction of the sectional area of the dumbbell test piece and is photographed at 1000-fold to 5000-fold magnification with a transmission electron microscope. In the photograph, with respect to any 100 primary dispersed phases, the maximum diameter and the minimum diameter of the fluororesin forming the primary dispersed phases are measured and averaged. The number-average value calculated from the average values of the measurement results is then specified as a number-average dispersion particle size (D1) in primary dispersed phases before melt retention. A molded product obtained by the above method is cut into about 3 mm square and is subjected to melt retention at the condition of 330° C. for 30 minutes in a melt flow indexer manufactured by Toyo Seiki Seisaku-sho, Ltd. (orifice of pore length of 8.00 mm and pore diameter of 2.095 mm, amount of sample of 7 g, retention time of 30 minutes and load of 5000 g). A thin piece of not greater than 0.1 µm in thickness is cut out from the center of resulting guts ejected after the melt retention in the direction of the sectional area of the dumbbell test piece and is photographed at 1000-fold to 5000-fold magnification with a transmission electron microscope. In the photograph, with respect to any 100 primary dispersed phases, the maximum diameter and the minimum diameter of the fluororesin forming the primary dispersed phases are measured and averaged. The number-average value calculated from the average values of the measurement results is then specified as a number-average dispersion particle size (D2) in primary dispersed phases after melt retention. The variation in number-average dispersion particle size in primary dispersed phases before and after melt retention is then determined in percentage by an equation of the variation= $((D2)/(D1)-1)$ using D1 and D2 obtained as described above.

A preferable procedure of controlling the dispersion state of the fluororesin in the PPS resin composition to the above conditions melt-kneads at least (a) the PPS resin and (b) one or more copolymers selected among the tetrafluoroethylene/hexafluoropropylene copolymer, the ethylene/tetrafluoroethylene copolymer and the tetrafluoroethylene/perfluoro(alkyl vinyl ether) copolymer in a twin-screw extruder at a temperature of not lower than the melting points of both (a) the PPS resin and (b) one or more copolymers selected among the tetrafluoroethylene/hexafluoropropylene copolymer, the ethylene/tetrafluoroethylene copolymer and the tetrafluoroethylene/perfluoro(alkyl vinyl ether) copolymer. The twin-screw extruder used for melt-kneading preferably has "L/D" of not less than 10 and includes a stirrer screw with cutouts as 3 to 20% of this L/D.

With regard to the PPS resin composition according to the embodiment of the invention, tensile strength (measured in conformity with ASTM-D638 (2010) using an ASTM No. 1 dumbbell test piece at a tension rate of 10 mm/min and 23° C.) as one of the physical properties indicating the material strength is preferably not lower than 30 Mpa, is more preferably not lower than 35 MPa and is furthermore preferably not lower than 40 MPa.

The PPS resin composition according to the embodiment of the invention preferably has the heat aging resistance in the following range. The tensile strength after heat treatment in the air at 200° C. for 100 hours is preferably not lower than 70%, more preferably not lower than 80% and furthermore preferably not lower than 85% relative to the initial physical property. The tensile elongation at break in a tensile test after heat treatment is preferably not lower than 2.5% and is more preferably not lower than 3.5%. There are no specific restrictions on the upper limit of strength retention before and after heat treatment and the lower limit of tensile elongation at break. The strength retention before and after heat treatment in the above range and the tensile elongation at break after the heat treatment in the above range indicate the good heat resistance of the resulting PPS resin composition. The strength retention before and after heat treatment and the tensile elongation at break of the PPS resin composition are significantly affected by the dispersion state of the fluororesin. The phase-separated structure that includes coarse dispersion of the fluororesin and is different from the desired phase-separated structure according to the embodiment of the invention causes deterioration of the mechanical properties and all the physical properties. Control of the dispersed structure is thus of importance, in order to provide the PPS resin composition including a relatively large amount of the fluororesin with the heat resistance of satisfactory level.

The "heat aging resistance" herein means a change in strength of the PPS resin composition before and after heat treatment. The heat aging resistance is calculated by the following procedure. After heat treatment in an atmosphere of 200° C. for 100 hours, an ASTM No. 1 dumbbell test piece is subjected to a tensile test under the conditions in conformity with ASTM-D638 (2019) for measurement of the maximum point strength. The strength retention is determined in percentage by dividing the maximum point strength after heat treatment by the maximum point strength before heat treatment.

The PPS resin composition according to the embodiment of the invention has the high strength retention before and after heat treatment and the high tensile elongation at break after heat treatment and is thus likely to have high heat resistance in continuous use in a high temperature environment.

With regard to the PPS resin composition according to the embodiment of the invention, the breakdown voltage as one of the electrical properties is preferably not lower than 17 kV/mm and is more preferably not lower than 18 kV/mm.

The "breakdown voltage" herein is a measured value in conformity with a short time breakdown test method of JIS C2110-1 (2010) with regard to a rectangular plate of 3 mm in thickness made of the PPS resin composition.

With regard to the PPS resin composition according to the embodiment of the invention, the relative permittivity as one of the electrical properties is preferably not higher than 3.2, is more preferably not higher than 3.0 and is furthermore preferably not higher than 2.9.

The "relative permittivity" herein is a measured value under the condition of a measurement frequency of 1 MHz in conformity with a transformer bridging method of ASTM D-150 (2011) with regard to a rectangular plate of 3 mm in thickness made of the PPS resin composition.

The breakdown voltage of lower than 17 kV/mm or the relative permittivity of higher than 3.2 is the poor electrical property and is thus unlikely to provide a PPS resin composition of the invention having the good balance among desired heat resistance, mechanical properties and electrical properties. There are no specific restrictions on the upper limit of the breakdown voltage and the lower limit of the relative permittivity.

(7) Applications

The polyphenylene sulfide resin composition according to the embodiment of the invention has excellent heat resistance, excellent mechanical properties, high breakdown voltage and low relative permittivity.

Accordingly a molded produce made of the polyphenylene sulfide resin composition according to the embodiment of the invention is suitably used for electric and electronic parts, communication device parts, automobile parts, electric home appliance parts and office automation equipment parts and is widely used for tubes, fibers, blow molded products, films, sheets and the like.

EXAMPLES

The following more specifically describes embodiments of the invention with reference to Examples and Comparative Examples, but the invention is not limited to these Examples.

Examples and Comparative Examples used the following as (a) the PPS resin, (b) the tetrafluoroethylene/hexafluoropropylene copolymer, the ethylene/tetrafluoroethylene copolymer and the tetrafluoroethylene/perfluoro(alkyl vinyl ether) copolymer and (c) the silane coupling compound.

[(a) PPS Resin (a-1)]

In a 70-liter autoclave equipped with an agitator and a bottom plugged valve, 8.267 kg (70.00 mol) of 47.5% sodium hydrosulfide, 2.957 kg (70.97 mol) of 96% sodium hydroxide, 11.434 kg (115.50 mol) of N-methyl-2-pyrrolidone (NMP), 2.583 kg (31.50 mol) of sodium acetate and 10.500 kg of ion exchange water were mixed and were gradually heated to 245° C. over about 3 hours at ordinary pressure under nitrogen stream. After distilling out 14.780 kg of water and 0.28 kg of NMP, the process stopped heating and started cooling down the reaction vessel. The remaining amount of water in the system per 1 mol of the supplied alkali metal hydrosulfide was 1.06 mol including the water content consumed for hydrolysis of NMP. The release amount of hydrogen sulfide was 1.30 mol, so that the amount of the sulfidizing agent in the system after this process was 68.70 mol.

After cooling down the reaction vessel to 160° C., the process added 10.235 kg (69.63 mol) of p-dichlorobenzene (p-DCB) and 9.090 kg (91.00 mol) of NMP, subsequently sealed the reaction vessel under nitrogen gas and raised the temperature from 200° C. to 238° C. at a rate of 0.6° C./minute with stirring at 240 rpm. After the reaction at 238° C. for 95 minutes, the process further raised the temperature to 270° C. at a rate of 0.8° C./minute.

After the reaction at 270° C. for 100 minutes (after completion of the polymerization reaction step), the process injected 1.260 kg (70.00 mol) of water into the reaction vessel while cooling down the reaction vessel from 270° C. to 250° C. over 15 minutes. The process gradually cooled down the reaction vessel from 250° C. to 220° C. over 75 minutes, then cooled down the reaction vessel rapidly to about room temperature and took the content out of the reaction vessel. The process diluted the content with about 35 liters of NMP to a slurry, stirred the slurry at 85° C. for 30 minutes and filtered the slurry with an 80-mesh sieve (opening of 0.175 mm) to obtain a solid substance. The obtained solid substance was washed with about 35 liters of NMP and filtered by the same procedure as described above. The process repeated three times a series of operations of diluting the obtained solid substance with 70 liters of ion exchange water, stirring the slurry at 70° C. for 30 minutes and recovering a solid substance by filtration with an 80-mesh sieve. The process then diluted the obtained solid substance and 32 g of acetic acid with 70 liters of ion exchange water, stirred the slurry at 70° C. for 30 minutes, filtered the slurry with an 80-mesh sieve, diluted a resulting solid substance with 70 liters of ion exchange water, stirred the slurry at 70° C. for 30 minutes and recovered a solid substance by filtration with an 80-mesh sieve. The process subsequently dried the obtained solid substance at 120° C. under nitrogen stream to obtain a dried PPS resin (a-1). The melt viscosity measured with Capilograph manufactured by Toyo Seiki Seisaku-sho, Ltd. was 200 Pa·s (at 300° C. and shear rate of 1216/s). The ash content was 0.03% by weight, and the amount of the volatile component was 0.4% by weight.

[(a) PPS Resin (a-2)]

The process performed the pre-processing step and the polymerization reaction step by the same procedure as that of the PPS resin (a-1) and subsequently performed the recovery step and the post-processing step by the following procedure to obtain a PPS resin (a-2).

After the reaction at 270° C. for 100 minutes (after completion of the polymerization reaction step), the process opened a discharge valve on the bottom of the autoclave, flushed the content under pressure with nitrogen into a vessel equipped with an agitator over 15 minutes, and stirred the flushed content at 250° C. for removal of most NMP. The resulting recovered substance, along with 74 liters of ion exchange water, was placed in an autoclave equipped with an agitator, was washed at 75° C. for 15 minutes and was subsequently filtered through a filter to give a cake. This series of operations was repeated four times. The process subsequently placed the resulting cake, along with 74 liters of ion exchange water and 0.816 kg of acetic acid in an autoclave equipped with an agitator, substituted inside of the autoclave with nitrogen and heated the autoclave to 195° C. The autoclave was then cooled down, and the content was taken out. The content was filtered through a filter to give a cake. The resulting cake was dried at 120° C. under nitrogen stream, so that a dried PPS resin (a-2) was obtained. The melt viscosity was 155 Pa·s (at 300° C. and shear rate of 1216/s). The ash content was 0.6% by weight, and the amount of the volatile component was 1.3% by weight.

[(b) Fluororesins (b-1 to b-3)]

b-1: tetrafluoroethylene/hexafluoropropylene copolymer (NEOFLON FEP NP-20 manufactured by Daikin Industries, Ltd., melting point: 270° C., MFR: 6.5 g/10 minutes (at 372° C. under 5 kg load)

b-2: ethylene/tetrafluoroethylene copolymer (NEOFLON ETFE EP-521 manufactured by Daikin Industries, Ltd., melting point: 265° C., MFR: 12 g/10 minutes (at 297° C. under 5 kg load)

b-3: functional group-containing ethylene/tetrafluoroethylene copolymer (NEOFLON EFEP RP-5000 manufactured by Daikin Industries, Ltd., melting point: 195° C.)

b-4: tetrafluoroethylene/perfluoro(alkyl vinyl ether) copolymer (Fluon PFA P-62XP manufactured by Asahi Glass Co., Ltd., melting point: 297° C., MFR: 36 g/10 minutes (at 372° C. under 5 kg load)

[(c) Silane Coupling Compound (c-1)]

c-1: γ-isocyanate propyl triethoxysilane (KBE-9007 manufactured by Shin-Etsu Chemical Co., Ltd.)

The following describes the evaluation and measurement methods employed in Examples and Comparative Examples.

[Ash Content]

Five grams of PPS base powder in the dried state was weighed in a crucible and is fired on an electric heater to a black lump substance. Firing continued in an electric furnace set at 550° C., until carbides were burned out. After the fired substance was cooled down in a desiccator, the weight of the fired substance was measured. The ash content was then calculated by comparison between the measured weight and the initial weight.

[Amount of Volatile Component]

Three grams of a sample was weighed and vacuum sealed in a glass vial having a body portion of 100 mm×25 mm, a neck portion of 255 mm×12 mm and wall thickness of 1 mm. Only the body portion of this glass vial was inserted into a ceramic electric tube furnace ARF-30K manufactured by Asahi Rika Seisakusho K.K. and was heated at 320° C. for 2 hours. After the vial was taken out, the neck portion of the vial which was not heated in the tube furnace and which volatile component adhered to was cut with a file and weighed. After the adhering gas was dissolved with 5 g of chloroform for removal, the neck portion wad dried in a glass dryer at 60° C. for 1 hour and was weighed again. The weight difference of the neck portion of the vial before and after removal of the volatile component was specified as the amount of volatile component (% by weight relative to the polymer).

[Area Ratio of Secondary Dispersed Phases to Primary Dispersed Phases]

A bending test piece of 127 mm in length, 12.7 mm in width and 6.35 mm in thickness was molded at a resin temperature of the melting points of the PPS resin and the fluororesin +30° C. and a mold temperature of 130° C. using an injection molding machine (SE75DUZ-C250) manufactured by Sumitomo Heavy Industries, Ltd. A thin piece of not greater than 0.1 μm in thickness was cut out from the center of this test piece in a direction of the sectional area of the dumbbell test piece and was photographed at 1000-fold to 5000-fold magnification with a transmission electron microscope H-7100 manufactured by Hitachi, Ltd. In the photograph, with respect to any 100 primary dispersed phases, an area (Sb) of the component (b) forming the primary dispersed phases and an area (Sx) of secondary dispersed phases included in the primary dispersed phases were determined by the cutout weight method, and the area ratio was then determined by the equation of $(Sx)/((Sb)+(Sx))$.

[Number-Average Dispersion Particle Size in Secondary Dispersed Phases]

The number-average dispersion particle size was a number average value calculated from average values of the measurement results of the maximum diameter and the minimum diameter with regard to secondary dispersed phases included in any 100 primary dispersed phases selected in observation with the transmission electron microscope by the same method as described above.

[Maximum and Minimum Dispersion Particle Sizes in Secondary Dispersed Phases]

The maximum and minimum dispersion particle sizes were obtained from the measurement results of the maximum diameter and the minimum diameter with regard to secondary dispersed phases included in any 100 primary dispersed phases selected in observation with the transmission electron microscope by the same method as described above.

[Variation in Number-Average Dispersion Particle Size in Primary Dispersed Phases Before and after Melt Retention]

With regard to any 100 primary dispersed phases in observation with the transmission electron microscope by the same method as described above, a number average value was calculated from average values of the measurement results of the maximum diameter and the minimum diameter of the fluororesin forming the primary dispersed phases and was specified as a number-average dispersion particle size (D1) in primary dispersed phases before melt retention. A molded product obtained by the above method was cut into about 3 mm square and was subjected to melt retention at the condition of 330° C. for 30 minutes in a melt flow indexer manufactured by Toyo Seiki Seisaku-sho, Ltd. (orifice of pore length of 8.00 mm and pore diameter of 2.095 mm, amount of sample of 7 g, retention time of 30 minutes and load of 5000 g). A thin piece of not greater than 0.1 μm in thickness was cut out from the center of resulting guts ejected after the melt retention in the direction of the sectional area of the dumbbell test piece and was photographed at 1000-fold to 5000-fold magnification with the transmission electron microscope. In the photograph, with respect to any 100 primary dispersed phases, the maximum diameter and the minimum diameter of the fluororesin forming the primary dispersed phases were measured and averaged. The number-average value calculated from the average values of the measurement results was then specified as a number-average dispersion particle size (D2) in primary dispersed phases after melt retention. The variation in number-average dispersion particle size in primary dispersed phases before and after melt retention was then determined by the equation of the variation $(\%)=((D2)/(D1)-1)$ using D1 and D2 obtained as described above.

[Tensile Test]

An ASTM No. 1 dumbbell test piece was molded at a resin temperature of the melting points of the PPS resin and the fluororesin +30° C. and a mold temperature of 130° C. using an injection molding machine (SE75DUZ-C250) manufactured by Sumitomo Heavy Industries, Ltd. The tensile strength and the tensile elongation at break of the obtained test piece were measured in conformity with ASTM D638 (2010) under the conditions of the span of 114 mm, the tension rate of 10 mm/min and the temperature of 23° C.×relative humidity of 50%.

[Heat Aging Resistance]

An ASTM No. 1 dumbbell test piece molded at a resin temperature of the melting points of the PPS resin and the fluororesin +30° C. and a mold temperature of 130° C. using an injection molding machine (SE75DUZ-C250) manufactured by Sumitomo Heavy Industries, Ltd. was treated in an atmosphere of 200° C. for 100 hours and was then subjected to a tensile test under the conditions in conformity with ASTM-D638 (2010) for measurement of the maximum point strength. The strength retention is determined in percentage by dividing the maximum point strength after heat treatment by the maximum point strength before heat treatment.

[Tensile Elongation at Break after Heat Treatment of 200° C. For 100 Hours]

An ASTM No. 1 dumbbell test piece molded at a resin temperature of the melting points of the PPS resin and the fluororesin +30° C. and a mold temperature of 130° C. using an injection molding machine (SE75DUZ-C250) manufactured by Sumitomo Heavy Industries, Ltd. was treated in an atmosphere of 200° C. for 100 hours and was then subjected to a tensile test under the conditions in conformity with ASTM-D638 (2010) for measurement of elongation of the test piece at break.

[Breakdown Voltage]

A rectangular plate of 80 mm×80 mm×3 mm in thickness was molded at a resin temperature of the melting points of the PPS resin and the fluororesin +30° C. and a mold temperature of 130° C. using an injection molding machine (SE75DUZ-C250) manufactured by Sumitomo Heavy Industries, Ltd. The obtained rectangular plate was subjected to measurement in conformity with a short time breakdown test method of JIS C2110-1(2010).

[Relative Permittivity]

A rectangular plate of 80 mm×80 mm×3 mm in thickness was molded at a resin temperature of the melting points of the PPS resin and the fluororesin +30° C. and a mold temperature of 130° C. using an injection molding machine (SE75DUZ-C250) manufactured by Sumitomo Heavy Industries, Ltd. The obtained rectangular plate was subjected to measurement in conformity with a transformer bridge method of ASTM D-150 (2011) using a dielectric loss measurement device TR-10C manufactured by Ando Electric Co., Ltd. The measurement frequency was 1 MHz, the major electrode diameter was 50 mm. The electrode was formed by applying a conductive paste.

Example 1

After 100 parts by weight of the PPS resin (a-1) and 100 parts by weight of the fluororesin (b-1) were dry-blended, the mixture was placed in a twin-screw extruder TEX 30α manufactured by the Japan Steel Works, LTD. (L/D=45, three kneading sections, ratio of stirrer screw with cutouts equal to 10% of L/D). The melt kneading conditions were temperature of 320° C. and peripheral velocity of 28 m/minute. This kneading method is specified as method A (Table 1). After pelletization with a strand cutter, the pellets were dried with hot air at 120° C. for 8 hours and were subjected to injection molding. The evaluation results of the dispersion state, the tensile strength, the tensile strength after heat treatment, the strength retention after heat treatment, the tensile elongation at break after heat treatment, the breakdown voltage and the relative permittivity are shown in Table 1.

Examples 2 to 7

PPS resin compositions were prepared by the same method as that of Example 1, except the composition ratios of the PPS resin (a-1, a-2), the fluororesin (b-1 to b-4) and the silane coupling compound (c-1) shown in Table 1 and were evaluated for physical properties by the same method as that of Example 1. The results of evaluation are shown in Table 1.

Comparative Examples 1 and 2

PPS resin compositions were prepared by the same method as that of Example 1, except the composition ratios of the PPS resin (a-1) and the fluororesin (b-1) shown in Table 1 and were evaluated for physical properties by the same method as that of Example 1. The results of evaluation are shown in Table 1.

Comparative Examples 1 and 2 gave PPS resin compositions including the fluororesin at the composition out of the range of 80 to 250 parts by weight. Comparative Example 1 including 50 parts by weight of the fluororesin had excellent heat resistance and excellent mechanical properties which the PPS resin intrinsically had, but had low breakdown voltage.

Comparative Example 2 including 300 parts by weight of the fluororesin, on the other hand, failed to obtain the resin composition in which the PPS resin formed a continuous phase, due to the excess amount of the fluororesin. The resulting resin composition had excellent electrical properties but poor heat resistance and poor mechanical properties.

Comparative Example 3

After 100 parts by weight of the PPS resin (a-1) and 100 parts by weight of the fluororesin (b-1) were dry-blended, the mixture was placed in a twin-screw extruder TEX 30α manufactured by the Japan Steel Works, LTD. (L/D=45, one kneading section without stirrer screw with cutouts). The melt kneading conditions were temperature of 320° C. and peripheral velocity of 28 m/minute. This kneading method is specified as method B (Table 1). After pelletization with a strand cutter, the pellets were dried with hot air at 120° C. for 8 hours and were subjected to injection molding. The results of evaluation are shown in Table 1.

Comparative Example 3 employed a standard screw arrangement without stirrer screw with cutouts for melt kneading. Irrespective of the same composition as that of Example 1, secondary dispersed phases of a different component were not observed in the tetrafluoroethylene/hexafluoropropylene copolymer forming primary dispersed phases. The resulting resin composition had poor mechanical properties due to the low affinity between the PPS resin and the fluororesin, and additionally had poor electrical properties caused by the dispersion state although its reason was unclear.

TABLE 1

|     |     |     |                 | EX 1 | EX 2 | EX 3 | EX 4 | EX 5 | EX 6 | EX 7 | COMP EX 1 | COMP EX 2 | COMP EX 3 |
|-----|-----|-----|-----------------|------|------|------|------|------|------|------|-----------|-----------|-----------|
| k1* | (a) | a-1 | parts by weight | 100  | 100  | 100  | 100  | 100  |      | 100  | 100       | 100       | 100       |
|     |     | a-2 | parts by weight |      |      |      |      |      | 100  |      |           |           |           |
|     | (b) | b-1 | parts by weight | 100  |      | 200  | 85   | 100  | 100  |      | 50        | 300       | 100       |
|     |     | b-2 | parts by weight |      | 100  |      |      |      |      |      |           |           |           |
|     |     | b-3 | parts by weight |      |      |      | 35   |      |      |      |           |           |           |
|     |     | b-4 | parts by weight |      |      |      |      |      |      | 100  |           |           |           |
|     | (c) | c-1 | parts by weight |      |      |      |      | 1    |      |      |           |           |           |
|     |     | k2* |                 | A    | A    | A    | A    | A    | A    | A    | A         | A         | B         |
| k3* | k4* |     | %               | 26   | 25   | 15   | 46   | 32   | 25   | 20   | 3         | —         | Not measured |
|     | k5* |     | μm              | 0.4  | 0.4  | 1.0  | 0.3  | 0.3  | 0.4  | 0.3  | 0.3       | —         | Not measured |

TABLE 1-continued

| | | | | | | | | | | | |
|---|---|---|---|---|---|---|---|---|---|---|---|
| | k6* | μm | 0.9 | 0.8 | 2.0 | 0.8 | 0.8 | 0.9 | 1.0 | 1.4 | — | Not measured |
| | k7* | μm | 0.15 | 0.12 | 0.20 | 0.16 | 0.18 | 0.15 | 0.15 | 0.22 | — | Not measured |
| | k8* | % | 18 | 17 | 35 | 10 | 7 | 15 | 19 | 10 | 104 | 73 |
| k9* | k10* | MPa | 37 | 46 | 32 | 45 | 41 | 35 | 37 | 60 | 25 | 23 |
| | k11* | MPa | 33 | 40 | 28 | 42 | 40 | 27 | 36 | 55 | 13 | 11 |
| | k12* | % | 89 | 88 | 88 | 93 | 98 | 77 | 97 | 92 | 52 | 48 |
| | k13* | % | 3.5 | 4.0 | 3.2 | 4.9 | 5.4 | 2.9 | 3.5 | 1.8 | 0.9 | 0.9 |
| | k14* | kV/mm | 17.2 | 18.0 | 20.5 | 17.3 | 17.2 | 17.1 | 17.3 | 16.5 | 21.0 | 16.7 |
| | k15* | | 2.70 | 2.97 | 2.55 | 2.76 | 2.70 | 2.80 | 2.77 | 3.30 | 2.50 | 3.06 |

(a): PPS resin
(b): Fluororesin
(c): Silane coupling compound
k1*: Composition
k2*: Kneading method
k3*: Dispersion state
k4*: Area ratio of secondary dispersed phases to primary dispersed phases
k5*: Number-average dispersion particle size in secondary dispersed phases
k6*: Maximum dispersion particle size in secondary dispersed phases
k7*: Minimum dispersion particle size in secondary dispersed phases
k8*: Variation in number-average dispersion particle size in primary dispersed phases before and after melt retention
k9*: Physical properties
k10*: Initial tensile strength
k11*: Tensile strength after heat treatment at 200° C. for 100 hours
k12*: Heat aging resistance (strength retention)
k13*: Tensile elongation at break after heat treatment at 200° C. for 100 hours
k14*: Breakdown voltage (3 mmt)
k15*: Relative permittivity (1 MHz)

The PPS resin composition is applicable to various known molding techniques such as injection molding, extrusion molding, compression molding, blow molding and injection compression molding and is especially suitable for extrusion molding and injection molding. The PPS resin composition of the invention is especially suitable for application of electric device parts such as generators, motors, voltage transformers, current transformers, voltage regulators, rectifiers, inverters, relays, power contacts, switches, breakers, knife switches, multipole rods, electric component cabinets, light sockets, various terminal boards, plugs and power modules.

REFERENCE SIGNS LIST

1: PPS resin continuous phase
2: primary dispersed phases formed by one copolymer selected among tetrafluoroethylene/hexafluoropropylene copolymer, ethylene/tetrafluoroethylene copolymer and tetrafluoroethylene/perfluoro(alkyl vinyl ether) copolymer
3: secondary dispersed phases formed by resin composition other than copolymer selected in 2

The invention claimed is:

1. A polyphenylene sulfide resin composition comprising 80 to 250 parts by weight of (b) one or more copolymers selected among a tetrafluoroethylene/hexafluoropropylene copolymer, an ethylene/tetrafluoroethylene copolymer and a tetrafluoroethylene/perfluoro(alkyl vinyl ether) copolymer, relative to 100 parts by weight of (a) a polyphenylene sulfide resin, wherein
   a molded product made of the resin composition has a resin phase-separated structure observed with an electron microscope, such that (a) the polyphenylene sulfide resin forms a continuous phase, that (b) one copolymer selected among the tetrafluoroethylene/hexafluoropropylene copolymer, the ethylene/tetrafluoroethylene copolymer and the tetrafluoroethylene/perfluoro(alkyl vinyl ether) copolymer forms primary dispersed phases, and that the primary dispersed phase in the resin composition includes secondary dispersed phases formed by a component different from the component of the primary dispersed phase.

2. The polyphenylene sulfide resin composition according to claim 1,
   wherein in the resin phase-separated structure of the molded product made of the resin composition observed with the electron microscope, an area ratio of the secondary dispersed phases to the primary dispersed phases is equal to or higher than 5%.

3. The polyphenylene sulfide resin composition according to claim 1,
   wherein in the resin phase-separated structure of the molded product made of the resin composition observed with the electron microscope, a number-average dispersion particle size in the secondary dispersed phases included in the primary dispersed phases is 0.01 to 2 μm.

4. The polyphenylene sulfide resin composition according to claim 1, further comprising
   0.1 to 5 parts by weight of (c) a silane coupling compound having at least one functional group selected from an isocyanate group, an epoxy group and an amino group, relative to 100 parts by weight of (a) the polyphenylene sulfide resin.

5. The polyphenylene sulfide resin composition according to claim 1,
   wherein the polyphenylene sulfide resin has an ash content of not higher than 0.3% by weight and an amount of a volatile component of not higher than 0.8% by weight when the polyphenylene sulfide resin is melt-kneaded under vacuum at 320° C. for 120 minutes.

6. A production method of the polyphenylene sulfide resin composition according to claim 1,
   the production method performs melt-kneading using a twin-screw extruder that has a ratio L/D of a screw length L to a screw diameter D of not less than 10 and includes a stirrer screw with cutouts as 3 to 20% of the ratio L/D.

7. A molded product made of the polyphenylene sulfide resin composition according to claim 1.

* * * * *